(12) United States Patent
Barbas et al.

(10) Patent No.: US 11,868,500 B2
(45) Date of Patent: Jan. 9, 2024

(54) FINE-GRAINED ACCESS CONTROL OF COLUMN-MAJOR RELATIONAL DATABASE MANAGEMENT SYSTEMS

(71) Applicant: International Business Machines Corporation, Armonk, NY (US)

(72) Inventors: Pedro Miguel Barbas, Dunboyne (IE); Enzo Cialini, Hamilton (CA); David Kelly, Robertstown (IE); Qinlong Luo, Milton, GA (US); Clara Liu, Markham (CA)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 17/211,229

(22) Filed: Mar. 24, 2021

(65) Prior Publication Data

US 2022/0309180 A1  Sep. 29, 2022

(51) Int. Cl.
| | |
|---|---|
| *G06F 21/62* | (2013.01) |
| *G06N 3/08* | (2023.01) |
| *G06F 16/22* | (2019.01) |
| *G06N 3/045* | (2023.01) |

(52) U.S. Cl.
CPC ........ *G06F 21/6227* (2013.01); *G06F 16/221* (2019.01); *G06N 3/045* (2023.01); *G06N 3/08* (2013.01)

(58) Field of Classification Search
USPC ......................................................... 726/28
See application file for complete search history.

(56) References Cited

U.S. PATENT DOCUMENTS

| 6,065,012 A | 5/2000 | Balsara |
| 6,253,203 B1 | 6/2001 | O'Flaherty |
| 6,496,832 B2 | 12/2002 | Chi |
| 7,243,097 B1 | 7/2007 | Agrawal |

(Continued)

FOREIGN PATENT DOCUMENTS

CN         107403106 B      6/2020

OTHER PUBLICATIONS

Agrawal et al., "Hippocratic Databases", Proceedings of the 28th VLDB Conference, Hong Kong, China, 2002, 12 pages.

(Continued)

*Primary Examiner* — Sanchit K Sarker
(74) *Attorney, Agent, or Firm* — Gilbert Harmon, Jr.

(57) ABSTRACT

A method of accessing objects with fine-grained access control (FGAC) in a relational database management system (RDBMS) storing a segmented column-major database. For each object with access restrictions, an artificial neural network (ANN), is trained by generating an equally distributed segment map of segmented data entries, so that the map reproduces the row disposition in the unsegmented object. When a user access request is received, these ANNs are referred to determine if any of the objects to be accessed are subject to access restrictions. If that is the case, then the ANN creates a pseudo-view construct of its associated object which is limited to data entries that the user has permission to access. The pseudo-views are then injected into the user access request to embed the fine-grained access controls for subsequent processing of the request, which can then proceed without further regard to user-specific access restrictions.

18 Claims, 8 Drawing Sheets

(56) References Cited

U.S. PATENT DOCUMENTS

| | | | |
|---|---|---|---|
| 8,639,947 B2 | 1/2014 | Elovici | |
| 9,037,610 B2 | 5/2015 | Rissanen | |
| 9,535,939 B2 | 1/2017 | Barber | |
| 9,535,940 B2 | 1/2017 | Barber | |
| 10,769,101 B2 | 9/2020 | Goenka | |
| 11,611,532 B1* | 3/2023 | Haefner | H04L 63/1425 |
| 2001/0042126 A1* | 11/2001 | Wong | G06F 21/6218 |
| | | | 709/229 |
| 2004/0215626 A1 | 10/2004 | Colossi | |
| 2011/0029569 A1* | 2/2011 | Ganesh | G06F 16/284 |
| | | | 707/E17.005 |
| 2011/0208780 A1 | 8/2011 | Bird | |
| 2014/0052749 A1 | 2/2014 | Rissanen | |
| 2019/0258953 A1* | 8/2019 | Lang | G06N 3/08 |
| 2020/0026710 A1 | 1/2020 | Przada | |
| 2020/0074107 A1 | 3/2020 | Barbas | |
| 2020/0120141 A1 | 4/2020 | Joseph | |
| 2021/0117517 A1* | 4/2021 | Bregman | H04L 63/102 |

OTHER PUBLICATIONS

Graefe, Goetz, "Query Evaluation Techniques for Large Databases", Based on a survey with the same title published in ACM Computing Surveys 25(2), Jun. 1993, p. 73-170. Revision of Nov. 10, 1993, 168 pages.

LeFevre et al., "Limiting Disclosure in Hippocratic Databases", Proceedings of the 30th VLDB Conference, Toronto, Canada, 2004, 12 pages.

Mell et al., "The NIST Definition of Cloud Computing", Recommendations of the National Institute of Standards and Technology, Special Publication 800-145, Sep. 2011, 7 pages.

* cited by examiner

300

Table A

| TSN | Column Group A: First Name, Last Name | | Column Group B: Age | Column Group C: City |
|---|---|---|---|---|
| 1 | John | Doe | 37 | New York |
| 2 | Jane | Doe | 38 | Las Vegas |
| 3 | Gary | Doe | 54 | Chicago |
| 4 | Mary | Doe | 18 | Miami |

CREATE NEURAL ACCESS CONTROL control-name
ON TABLE table-name
INCLUDE COLUMNS columns-name/ALL
WHERE access-condition
FOR RECIPIENT recipient-exception-authorization-name
EXCEPT RECIPIENT recipient-authorization-name
ENABLE;

FIG. 4

FINE-GRAINED ACCESS CONTROL OF COLUMN-MAJOR RELATIONAL DATABASE MANAGEMENT SYSTEMS

FIELD OF THE INVENTION

The present disclosure relates to computer programs, computer program products and computer-implemented methods for fine-grained access control (FGAC) of column-major relational database management systems (RDBMSs).

BACKGROUND

Enterprise Performance Management (EPM) systems have become central to the operation of many businesses enterprises. EPM systems are used to support management of business components and in particular internal functions including: Finance & Accounting, Sales & Marketing, Human Resource Management, Information Technology, Customer Service, Supply Chain Management, Operations & Fulfilment, and Internal Audit & Risk. Each internal function typically has its employees, strategies, analysis requirements, goals, Key Performance Indicators (KPIs), action plans, and Critical Success Factors (CSFs). In order for an enterprise to perform well, it is important that each of its business components and internal functions provide effective mechanisms to ensure data security compliance so that integration of the business components and internal functions at enterprise level can take place effectively. Many data repository systems, including EPM systems, implement Discretionary Access Control (DAC), which are object privileges granted to a user to control whether or not access to the data in the object is allowed. These privileges may be managed by role-based access controls (RBAC), where a user wishing to access data in an object must be a member of a role permitted to access the data in the object. Another technique for controlling access to data in an object is to use a label-based access control (LBAC) mechanism, by which, unless a label of a user is compatible with a label associated with a part of an object, the data for that object part is not returned to the user. Due to the restrictive nature of label components, business enterprises have turned to more flexible mechanisms, e.g., FGAC mechanisms including views, triggers, Oracle's virtual private database, and IBM's DB2 row and column access control.

BRIEF SUMMARY OF THE INVENTION

According to an embodiment of the present invention, a computer-automated method for accessing objects in a segmented column-major database with fine-grained access control (FGAC) taking account of user-specific access restrictions to data entries in the objects, the method comprising: providing an artificial neural network (ANN) structure of multiple ANNs, each storing an equally distributed segment map of segmented data entries of an object so as to permit reproduction of the row disposition of data entries in that object prior to segmentation; receiving an access request from a user to access data in one or more objects stored in the segmented column-major database; referencing the ANN structure to determine if any objects to be accessed by the access request are subject to access restrictions; modifying the access request by referencing the ANN of each access-restricted object to generate a pseudo-view construct for that object that is limited to data entries that the user has permission to access, thereby to embed the FGAC in the access request; and processing the modified access request based on the pseudo-view constructs to generate and return a result that takes account of the access restrictions.

According to an embodiment of the present invention, a computer program product for accessing objects in a segmented column-major database with fine-grained access control (FGAC) taking account of user-specific access restrictions to data entries in the objects, the computer program product comprising: one or more non-transitory computer readable storage media and program instructions stored on the one or more non-transitory computer readable storage media, the program instructions comprising: program instructions to provide an artificial neural network (ANN) structure of multiple ANNs, each storing an equally distributed segment map of segmented data entries of an object so as to permit reproduction of the row disposition of data entries in that object prior to segmentation; program instructions to receive an access request from a user to access data in one or more objects stored in the segmented column-major database; program instructions to reference the ANN structure to determine if any objects to be accessed by the access request are subject to access restrictions; program instructions to modify the access request by referencing the ANN of each access-restricted object to generate a pseudo-view construct for that object that is limited to data entries that the user has permission to access, thereby to embed the FGAC in the access request; and program instructions to process the modified access request based on the pseudo-view constructs to generate and return a result that takes account of the access restrictions.

According to an embodiment of the present invention, a relational database management system (RDBMS) comprising: a data store configured to store a segmented column-major database; an artificial neural network (ANN) structure of multiple ANNs, each storing an equally distributed segment map of segmented data entries of an object so as to permit reproduction of the row disposition of data entries in that object prior to segmentation; at least one long short-term memory (LSTM) network configured to store the ANN structure; an input configured to receive user access requests to access data in one or more objects stored in the segmented column-major database; an access request pre-processor operable to reference the ANN structure to determine if any objects to be accessed by the access request are subject to access restrictions and to modify the access request by referencing the ANN of each access-restricted object to generate a pseudo-view construct for that object that is limited to data entries that the user has permission to access, thereby to embed the FGAC in the access request; an access request processor operable to process access requests, including said modified access requests that have been subject to said pre-processing, to generate a result; and an output for returning a result that takes account of any access restrictions.

BRIEF DESCRIPTION OF THE DRAWINGS

In the following, embodiments of the present invention will further be described by way of example only with reference to the exemplary embodiments illustrated in the figures.

FIG. 3 depicts an example table (Table A) organized by column.

FIG. 4 depicts the syntax of a neural access control command.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Data access according to the disclosure is provided within a RDBMS that stores data tables by column. The data tables are thus the records of the database. A database that stores table data by column is referred to as a column-major database, since it stores the tables in column-major order. In a data store of a column-major database, all the values for a given column are stored in sequence, with the following column being stored similarly thereafter and so forth. Storing the columns in sequence in this way enables records to be reconstructed without the need to store a row identifier (rowID) with each data value. A table management engine assigns a tuple sequence number (TSN) to each data value in each column of the table according to a sequence order in the table, wherein data values that correspond to each other across a plurality of columns of the table have equivalent TSNs.

A suitable RDBMS for incorporating embodiments of the disclosure is as follows. The RDBMS has a data storage device that supports intra-block partitioning. The data values are stored in fixed-size units of data called blocks. Each data value is additionally assigned to a partition based on a representation of the data value. This is implemented by assigning a tuple map value to each data value, so that the tuple map value identifies the partition in which its associated data value is located. The RDBMS uses intra-block partitioning (IBP) to store data in a table by assigning values within blocks for each column and representing the data values with long runs of fixed length values for efficient processing. The IBP uses stable partitioning, such that within each partition, values are in the same order as the global tuple ordering, which is the same for all columns in the table.

Figure 1:
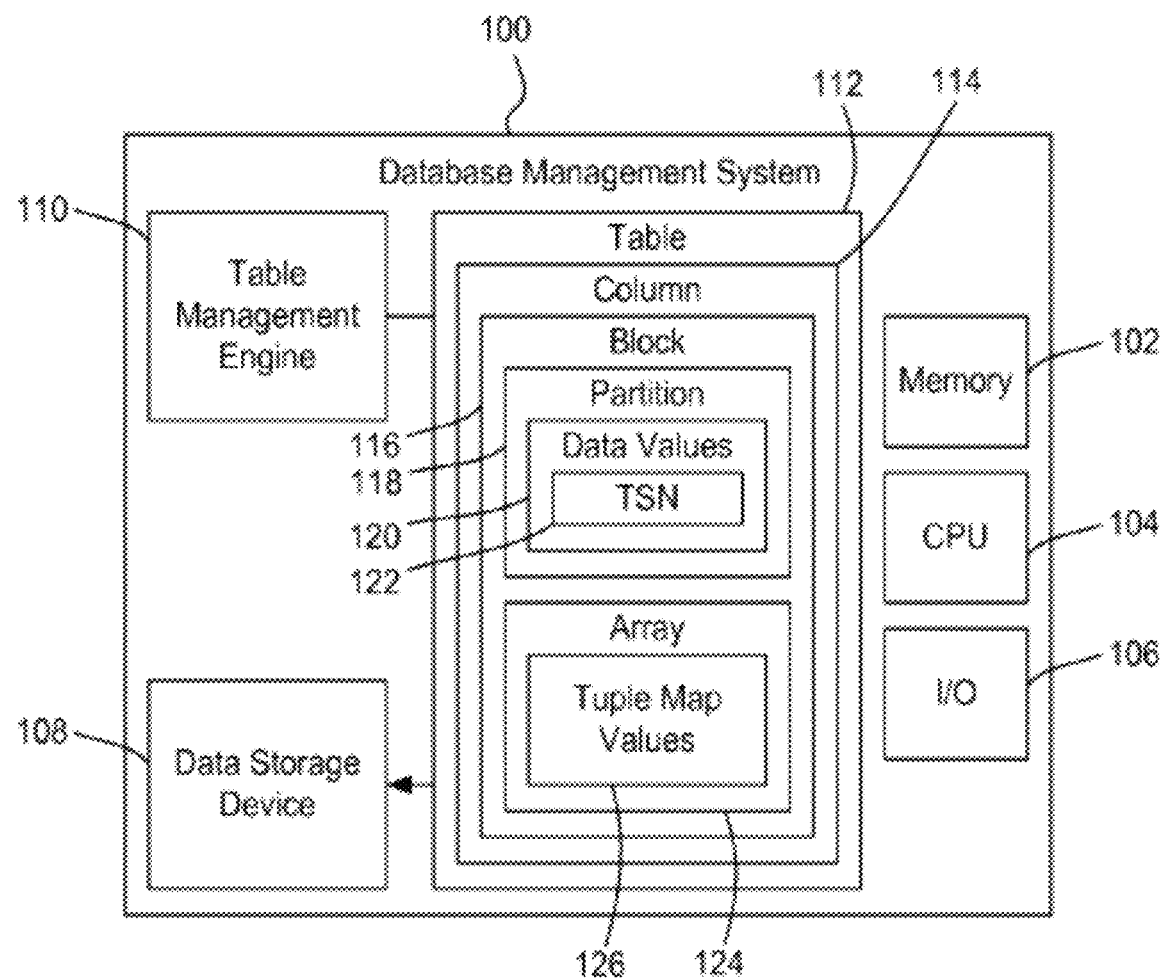
FIG. 1 is a schematic diagram of a RDBMS in which embodiments of the disclosure may be implemented.

FIG. 1 is a schematic diagram of such a RDBMS 100 in which embodiments of the disclosure may be implemented. At least some of the components of the RDBMS 100 are implemented in a computer system. For example, the functionality of one or more components of the RDBMS 100 may be implemented by computer program instructions stored on a computer memory device 102 and executed by a processing device, such as a central processing unit (CPU) 104. The RDBMS 100 may include other components, such as input/output devices 106, a data storage device 108, and a table management engine 110. Some or all of the components of the RDBMS 100 may be stored on a single computing device or on a network of computing devices, including a wireless communication network.

The table management engine 110 manages data in a table 112 that is stored on the data storage device 108. In some embodiments, the RDBMS 100 may include more than one data storage device 108 for holding one or more tables 112. One or more data storage devices 108 may be located on one or more computing device or across a network of computing devices and may share table data across one or more of the computing devices.

The table 112 is stored on the data storage device 108 in column-major order in a list of blocks 116 for each column 114 in the table 112. Storing the data in column-major order has the advantage of allowing database queries to operate more efficiently, because the system accesses only the columns 114 specified in the query, rather than all columns 114 in the table 112.

Each column 114 within the table 112 is divided into one or more blocks 116 based on the number of data values 120 stored in the column 114. Each block 116 may contain up to a predetermined number of data values 120. Each data value 120 in a given column 114 may be assigned a TSN 122. The TSN 122 may be assigned according to a sequence order in the table 112, which may also correspond to the order in which the data values 120 were inserted into the column 114. TSNs 122 may be specific to each column 114, such that data values 120 that occupy the same position in different columns 114 may have the same TSN 122. Data values 120 in different columns 114 that occupy the same position in the different columns 114 may be linked using a common TSN 122.

Each block 116 in each column 114 may be divided into partitions 118. The partitions 118 are created and stored in a stable way that respects the original tuple order of the block 116 and within each partition 118. This allows the system to maintain an array 124 that is based on the number of partitions 118. The partitions 118 created by the table management engine 110 are determined by the types of representations of the data values 120 in the block 116. For example, if the block 116 includes data values 120 that are encoded to a certain number of bits and data values 120 that are unencoded, the table management engine 110 may divide the block 116 into two partitions 118. The first partition 118 may include the encoded data values 120 and the second partition 118 may include the unencoded data values 120. In some embodiments, the block 116 may include data values 120 that all share a single representation method, such that the block 116 includes only a single partition 118.

The representation within each partition 118 follows a dictionary coding scheme, though other embodiments may follow other fixed-length coding schemes, such as run-length encoding or variable length encoding in which unencoded values may be represented in a variable-length format. The representation may use more than one encoding scheme for different data values 120 within the same column 114.

New records 250 may be added to the table 112 via a buffer 260 by inserting the corresponding data values 120 into a trailing block 116 in each column 114. The system may determine which representations apply to the data values 120 in the new records 250 and append the data values 120 to the corresponding partitions 118.

The system assigns a tuple map value 126 to each data value 120 in the block 116 and stores the tuple map value 126 in an array 124. The tuple map value 126 identifies the partition 118 in which each data value 120 is located. The size of the tuple map value 126 is based on the number of partitions 118 used in the given block 116. A block 116 that has only two partitions 118, for example, may have an array 124 with single-bit values to indicate the partitions 118.

Figure 2:
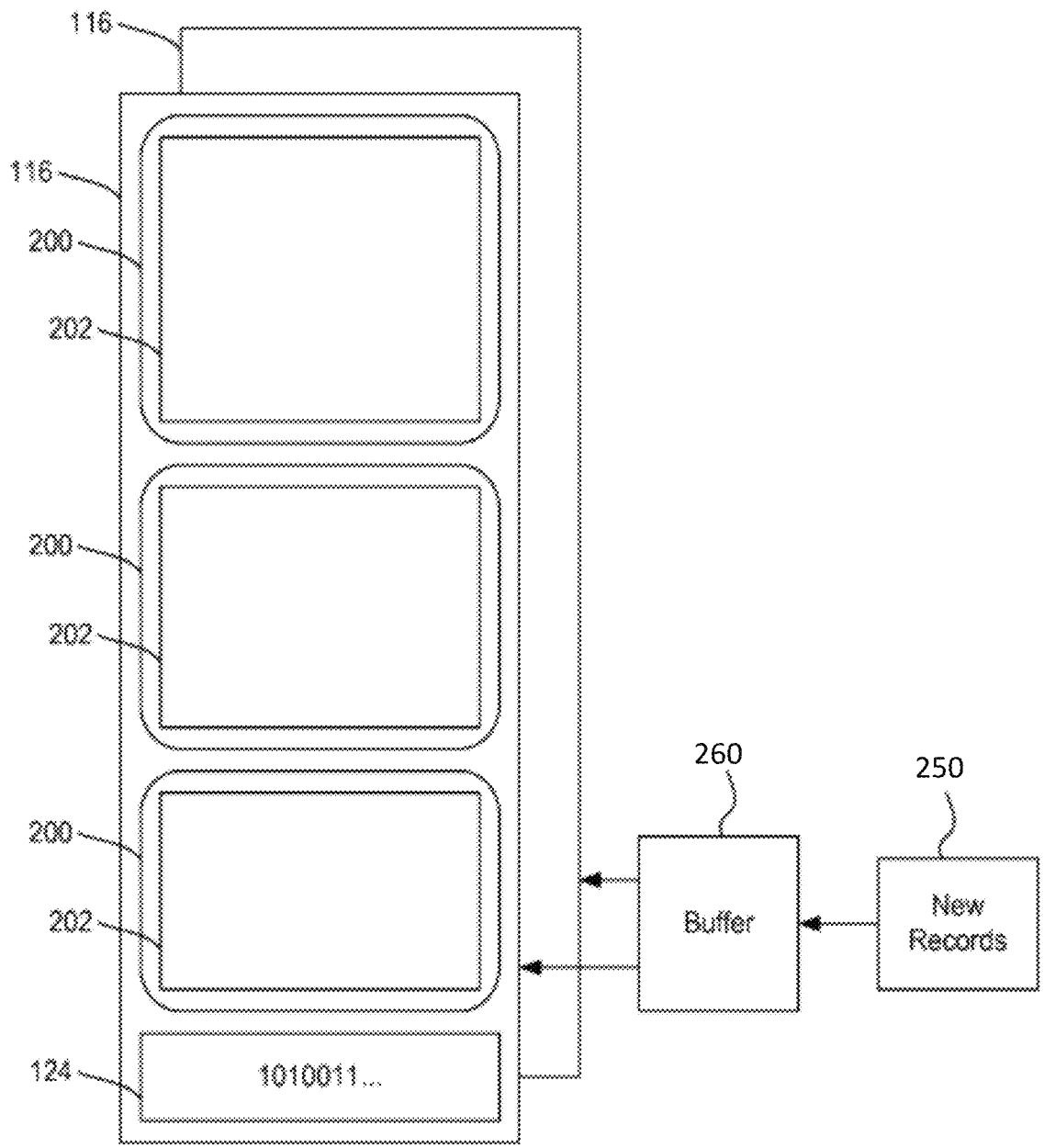
FIG. 2 is a schematic diagram of an example column block.

FIG. 2 shows an example column block 116. The column block 116 contains all data values 120 corresponding to data values 120 within a range of TSNs 122. The TSNs 122 identify the order of insertion of the data values 120 in the column 114. The data blocks 116 in each column 114 may have a maximum number of data values 120 according to a predetermined block size. The predetermined block size may be a fixed length determined according to the capabilities or configuration of the RDBMS 100. If a column 114 has fewer data values 120 than the predetermined block size, the column 114 may include only one block 116. If the block 116 has more data values 120 than the predetermined block size, the column 114 may include more than one block 116. Each block 116 in a given column 114 may include different partitions 118 and different numbers of partitions 118 than other blocks 116. For example, a first block 116 may contain two partitions 118 corresponding to data values 120 that are either uncompressed or compressed to a 10-bit code. A second block 116 may include three partitions 118 corresponding to data values 120 that are uncompressed, compressed to a 10-bit code, and data values 120 that are compressed to a 4-bit code.

The blocks 116 for a given column 114 may be maintained in TSN order according to the TSN ranges corresponding to each column 114. Within the blocks 116, the data values 120 may not be stored in TSN order, though queries or other processes performed on the table 112 may retrieve and display the data values 120 in TSN order. The data values 120 are separated into partitions 118 within the corresponding blocks 116. The partitions 118 may be contained in separate regions 200, which are contiguous portions of a block 116. Each region 200 may include a bank 202, which may contain encoded or unencoded values. The bank 202 may be a unit for scanning the data values 120 when running a process to access the data values 120 in a given block 116.

Each region 200 contains one partition 118 of the column 114. Data values 120 may be stored in the different partitions 118 based on the way each data value 120 may be represented in the database table 112. In one embodiment, each partition 118 includes a set of values from a column 114 having similar frequencies and identical-length encodings. For example, a data value 120 that is represented as an uncompressed value is stored in a partition 118 with other data values 120 that are represented as uncompressed values. In another example, data values 120 that are represented as a compressed value with a given number of bits are stored in a partition 118 with other data values 120 represented as a compressed value with the same number of bits.

The block 116 also includes an array 124 in which the tuple values are stored that index the data values 120 to the corresponding regions 200 or partitions 118. The number of bits in the tuple values may depend on the number of partitions 118 in the block 116. For a block 116 that includes two partitions 118, for example, the partitions 118 may be represented using a single bit (i.e. a 'one' or a 'zero'). For blocks 116 that include more than two partitions 118, the partitions 118 may be represented by more than one bit in the array 124. The array 124 may help the RDBMS 100 in retrieving the data values 120 in TSN order when a query process or other process requests the data values 120.

New records 250 to be inserted into a table 112 are assigned TSNs 122 according to an insert order. The TSN 122 assigned to the data values 120 in a single record allow the RDBMS 100 to identify each of the data values 120 with the corresponding new records 250. The TSN 122 is the same for each of the data values 120 in a single record. Each data value 120 of the inserted record may be inserted into the trailing block 116 of the corresponding column 114. An insert program (or loader) may represent the data values 120 using the smallest representation that can hold that value (choosing an unencoded representation in the worst case). The chosen representation determines which partition 118 within the corresponding block 116 holds the data values 120. The insert program accordingly assigns the tuple map value 126 with the corresponding partition 118 to the array 124 and inserts the data value 120 to the chosen partition 118.

Further details of how to implement intra-block partitioning in a column-major database are described in U.S. Pat. No. 9,535,939 B2 and U.S. Pat. No. 9,535,940 B2, both assigned to International Business Machines Corporation, the full contents of both of which are incorporated herein by reference.

FIG. 3 shows an example table 300 (Table A) of a column-major database of a RDBMS with column groups A, B and C. Column Group A contains two columns, while Column Groups B and C each contain one column. The columns are arranged logically in sequence, as indicated by the TSNs. Rows of each column are presumed to have a one-to-one correspondence with one another, and such a correspondence defines thereby the rows of Table A. Let us assume that the data in Table A required to have FGAC restrictions are the Column Group A data values "Jane Doe" and "Mary Doe", and the Column Group C data values "Las Vegas" and "Miami" The data entries subject to access restrictions are segmented into separate distinct groups. However, the segmentation breaks the initial sequence of tuples in Table A, since the access-restricted data entries were initially in 'rows' 2 and 4, but after segmentation will be represented by new 'rows' 1 and 2 of a new data segment. Consequently, at some future point in time, when it is necessary to reconstruct a table from the data segments, the initial sequence of the values in the table will have been lost, so without reference to additional data, e.g. from data logs, it will not be possible to reconstruct Table A.

The present disclosure addresses this challenge by using an ANN map structure to allow reconstruction of a table from its segmented data groups. In certain embodiments, the objects are tables and the segment map indicates which segment belongs to which row in each table, there being a segment map for each table that contains access-restricted data entries. The segment map when combined with the column structure of the unsegmented database (which is preserved in the segmented column-major database) can thus provide FGAC to the tables.

In certain embodiments, the segmented data entries are tuple column group data entries. wherein the access request is a structured query language (SQL) query statement. The ANN structure may be stored in one or more long short-term memory (LSTM) networks. After modifying the access request, the modified access request can be further processed without needing to have further regard to user-specific access restrictions, since the FGAC limitations have been incorporated in the access request through its modification to limit to filtered pseudo-views of the underlying data. In particular, processing of the modified access request can include parsing the user access request into a plurality of components, transforming the components into a compiler definition, compiling the compiler definition to generate the result, and returning the result to the user.

The embodiments allow an ANN structure to be applied in a FGAC scheme to control access to a dataset in a way that can provide one or more of the following advantages: ANN-controlled access to specific combinations of data from a column-major database; ANN-controlled access to a column-major database without having to change the original record disposition; and ANN-controlled access to a column-major database without affecting query processing, data compression or space utilization, and specifically without requiring any additional data infrastructure. For example, indexing infrastructures, to be applied to the table data.

The present disclosure provides a method which pre-processes SQL statements to evaluate for each table reference whether the referenced table has a neural access control defined for it. A neural access control is defined in the database as an object-specific function that contains a definition of access restrictions to data contained in the object. The neural access control can be stored in the database metadata privacy catalog. In the following examples, we assume the object is a table. If the object referenced by a SQL statement has a neural access control, then the neural access control is applied when processing the SQL statement in order to provide the FGAC functionality, i.e. to take account of access permissions possessed by the requesting user to any data in the object that are subject to user-specific access restrictions.

The neural access control function of a table is a dynamic pseudo-view object representation of the neural access control for the table. Pseudo-view is a term used to express the filtered view as made available at the front-end of the neural network to a particular user taking account of that user's permissions. A pseudo-view of a table is thus a view of the table in which table data that the user is not entitled to see is not visible. To evaluate the tables for neural access control, first the neural network engine is consulted to see if the data that the user is requesting is protected. If the data is protected, then the data will be stored in the neural network structure, and the construction of the pseudo-view will reflect permissions that the user may or may not have to the protected data. After all tables have been evaluated for neural access control and the resultant pseudo-view has been created, the pseudo-view constructs are injected into the SQL statement representation and then passed to the subsequent SQL compiler processing logic for normal processing. Injecting the pseudo-view constructs in this way effectively replaces the original SQL request by another SQL request that is appropriately modified based on the entitlements of the requesting user to view protected data. With this approach, the conventional query rewrite and optimization operations performed by the SQL compiler are not affected. In other words, applying the neural access control to the SQL statement only amends the SQL statement within the bounds of SQL, so subsequent handling of the amended SQL statement can proceed conventionally. The result is then presented to the user. In this way, any access request that seeks to access objects with access restricted data is pre-processed using the ANN structure, so that the access request is modified as necessary to comply with the user-specific access restrictions. Since the FGAC limitations are expressed in the amendments made to the user request through the pseudo-views, the modified user request can be processed after this pre-processing without having further regard to access restrictions. In other words, subsequent processing of the SQL statement through parsing, compiling and so forth can proceed entirely conventionally.

FIG. 4 gives the syntax 400 of a neural access control command. The command states that those in recipient-authorization-name are allowed access to table table-name, on columns columns-name, when the access condition access-condition is valid:

control-name is the name of the neural access control that is being created. The name is unique, so cannot be the same as the name of a previous control that already exists.

table-name is the name of the table where the neural access control has its domain.

columns-name are the name of the columns where the neural access control has its domain. The name is set to ALL when the neural access control has all columns in the table as its domain.

access-condition is the result of the search condition where the neural access control has its domain, i.e., column, row or cell access.

recipient-exception-authorization-name is the name of the recipient that has excluded access to the table table-name on columns columns-name with access condition access-condition.

recipient-authorization-name is the name of the recipient that has authorization access to table table-name on columns columns-name with access condition access-condition.

Once neural access controls have been configured for a table, any SQL statement that attempts to access that table will have the neural access control definition imposed on that access.

Figure 5:
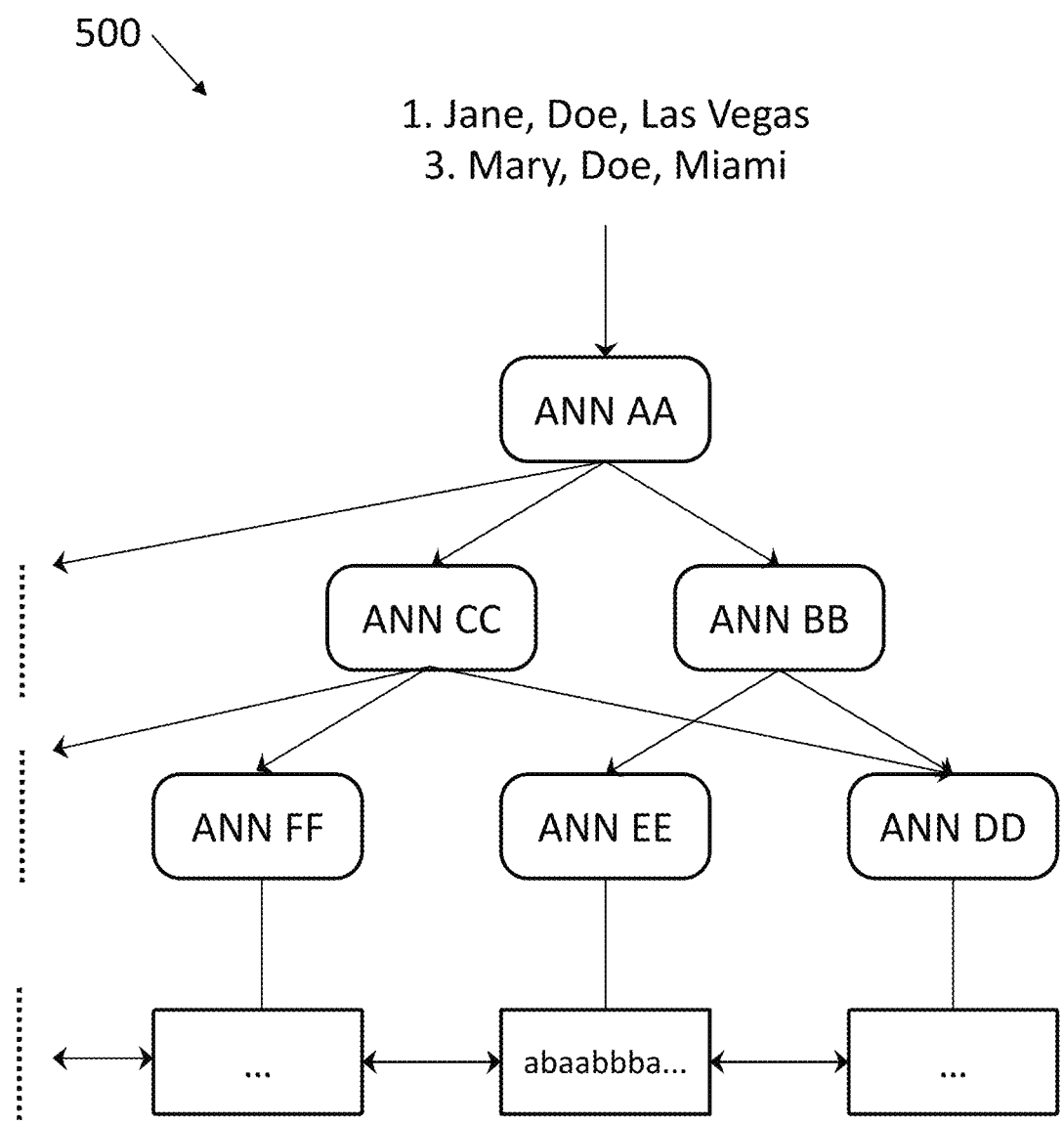
FIG. 5 is a schematic representation of an organized artificial neural network map structure.

FIG. 5 is a block diagram illustrating an example neural system 500 with a multi-level map structure of ANN models. Each ANN model may, for example, comprise a long short-term memory (LSTM) network and one fully connected cluster with randomly loaded initial parameters. The neural system trains the ANN models level by level from the top level downwards. Multiple ANN models at the same level (e.g., ANN CC and ANN BB) can be trained simultaneously. The goal of the system is to provide a segment map to indicate which segment belongs to which row, while still preserving in memory the initial structure of the columns of the column-major database system.

In a first phase, the ANN map structure receives data from column groups and separates the same data from each group column into different segments, where segments correspond to rows. The separation into segments reduces the complexity of the ANN models that need to be generated and maximizes the joining relationship between the ANN models. Pre-processed column group data representing prior knowledge of row order for that ANN (i.e. ground truth data) is then encoded and equally distributed in the vector space by using a supervised learning approach. The supervised learning allows the key segment distribution values in each data segment to be learned. Since the key segment distribution for each "row" may be different in each ANN, we use multiple ANN's to learn the final key segment distribution for a specific "row." A gradient descent algorithm is used to optimize from the initial key segment positions to the output key segment positions until the ANN model merges. Since each ANN sub model is randomly loaded, the neural network learns different associations between tuple column group data, divides the tuple column group data from distinct dispositions (that will define the number of models in the next phase), hence achieving a smaller collision degree. After consuming the key segment value flows, the LSTM encodes the data values into vectors, that will be processed through the first fully connected cluster, and outputs values V that will be assigned to the v'th model in the next sequence for processing. A loss function may then calculate the best fit possible option for the next sequence, considering both the total size of the group columns data (total number of observations to be protected, aka data points) and the total number of models in the next phase.

In a second phase, using an unsupervised learning approach, a new ANN group receives the output from an existing ANN group (e.g., ANN CC and ANN BB are a new ANN group that receives the output from ANN AA in FIG. 5). The new ANN group generates a map of segment entries as an array, where such map defines thereby data subjected to FGAC limitations. The ANN group comprises a LSTM network and one fully connected cluster with randomly loaded starting parameters. Input key tuple data is forward propagated through the LSTM network. Using the argmax function, map values can be determined as the aggregate set of the maximum values obtained from the output vectors calculated as the classification probabilities of the logits through the softmax function. Logits outputs are vectors obtained based on the total size of the group columns data (data points) and the total size of the map array. A loss function, such as a L2 (least square) loss function, may then be calculated and optimized by the gradient descent algorithm. The equally distributed map of segment entries is saved in the original record disposition (i.e., it is not segmented). One or two bits are in general enough for the segment map entries.

For the RDBMS, several ANNs are thus provided for learning and at least one LSTM network is provided for storing the ANNs. Each individual ANN is responsible for learning and understanding the relation between sequences of data entries, such as words or characters. Accordingly, each ANN learns independently of the other ANNs, while keeping a connection with its neighboring ANNs. As a result, each ANN is capable of learning the relation of the characters or words belonging to the same "database table row" so that the ANN once trained knows what characters and words are present in each "database table row". This learning is then stored as a map as discussed below in the example as "abaabbba."

FIG. 5 illustrates a simple example. The first segment given by tuple column group data 1, "Jane, Doe, Las Vegas" is provided to the first ANN group structure where each string is processed individually by ANN AA, resulting in a key that represents the subsequent model. The subsequent ANN BB recomputes the same segment 1 "Jane, Doe, Las Vegas" and transfers it to ANN EE where initial segment map entries are then generated. As a result, the map of segment entries is generated as an array. The labels 'a' and 'b' refer to the first and second segments respectively in the segment map entries array "abaabbba". Accordingly, each fine-grained access data segment can be identified and retrieved when needed thereby allowing reconstruction of the original record which the segment belongs to, while still preserving in memory the initial structure of the columns of the column-major database system.

In this example there are two "table row" values: "1, Jane, Doe, Las Vegas" and "3, Mary, Doe, Miami". The neural network structure needs to know that there are two distinct rows to process, and further it needs to learn what are the words and characters that belong to each row and how they are combined. Jane is not the same as Jena—these both have the same characters in each word, but in a different combination. In this example, all this knowledge learnt by the ANN is translated into the example map "abaabbba" (stored as a long array of map segments), where 'a' represents the first row and 'b' represents the second row, although the ANN does not in fact store any simple correspondence between its segment map and rows of the table, rather the knowledge of the correspondence that it has learned.

Figure 6:
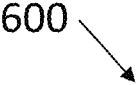
FIG. 6 depicts a table EPM.CUSTOMERS according to an example.
Figure 7:
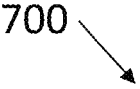
FIG. 7 depicts a neural access control definition for the example table EPM.CUSTOMERS.

FIG. 6 shows an example neural access control definition 600 created for table EPM.CUSTOMER. FIG. 7 shows an example statement 700 that would create a neural access control on the table EPM.CUSTOMER subject to the following conditions being verified:

COMPANY_ID='76TD8' AND
ENTERPRISE_NUMBER='X54763'

All the users having access to the database system need to verify these conditions when requesting access to the data on table EPM.CUSTOMER. However, neither user ARVIND nor the database role VP_ALL needs to verify these conditions when requesting data access from this table. This will create an internal neural access control where data in the table that verifies the condition

COMPANY_ID='76TD8' AND
ENTERPRISE_NUMBER='X54763' is managed through the artificial neural network ANN structure as described above and the remaining data is managed normally through standard intra-block partitioning structure. Accordingly, users with the role VP_ALL and user ARVIND have access to the data managed by the ANN structure, whereas other users only have access to the intra-block partitioning structure data.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computer system. Rather, embodiments of the present invention are capable of being implemented in conjunction with any other type of computer system now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multitenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computer system is service oriented with a focus on statelessness, low coupling, modularity, and semantic interoperability. At the heart of cloud computing is an infrastructure that includes a network of interconnected nodes.

Figure 8:
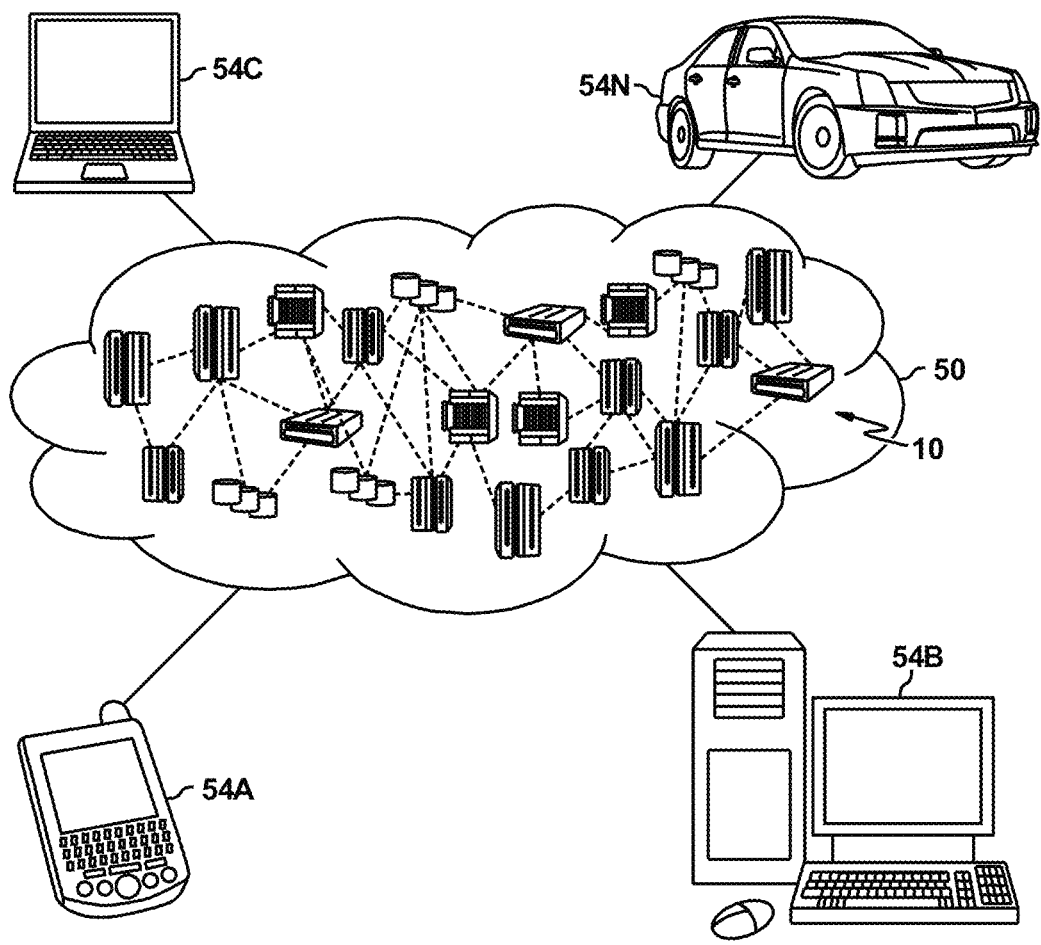
FIG. 8 depicts a cloud computer system according to an embodiment of the disclosure.

Referring now to FIG. 8, illustrative cloud computer system 50 is depicted. As shown, cloud computer system 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computer system 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computer system 50 can communicate with any type of computerized device over any type of network and/or network addressable connection (e.g., using a web browser).

Figure 9:
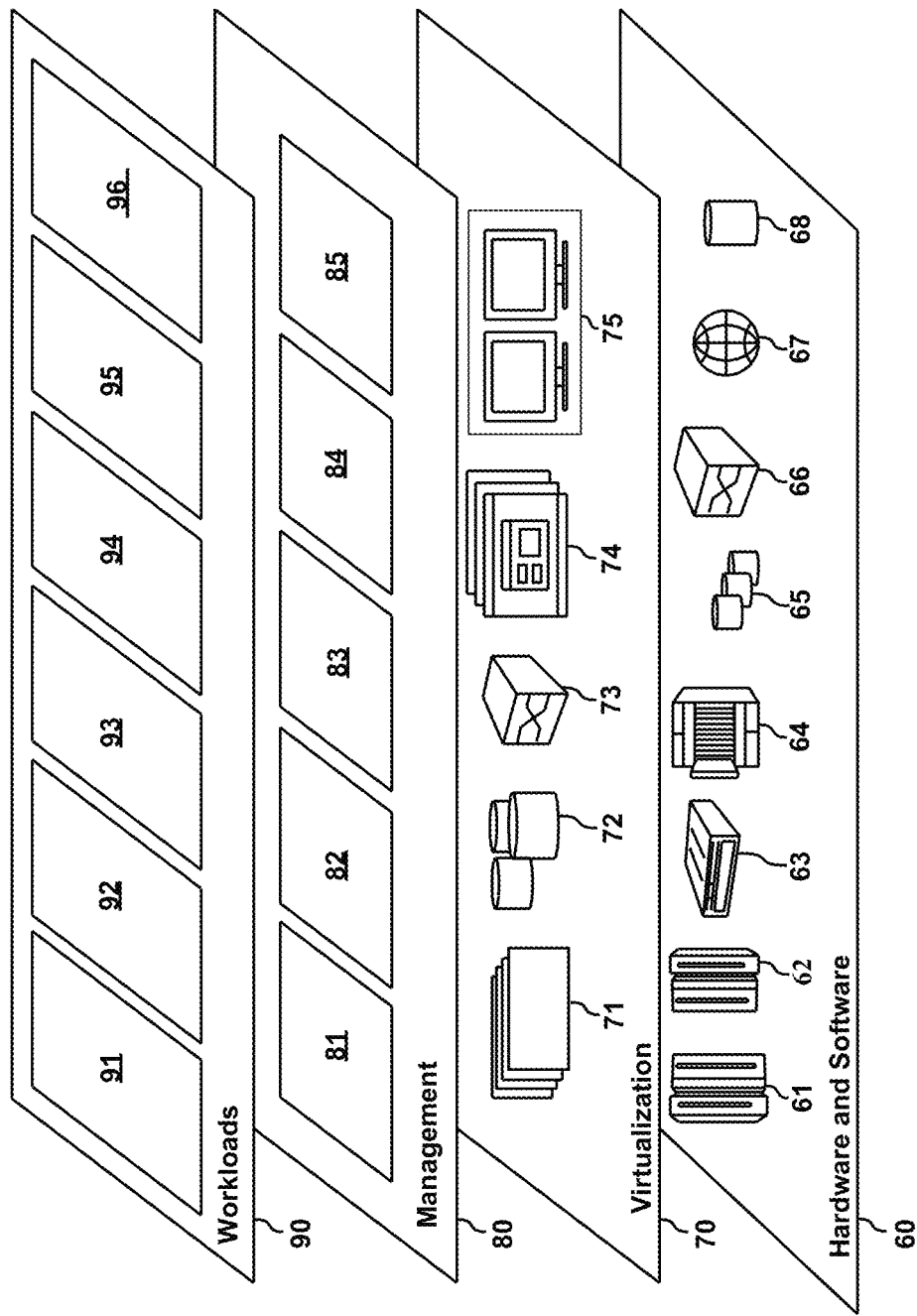
FIG. 9 depicts abstraction model layers according to an embodiment of the disclosure.

Referring now to FIG. 9, a set of functional abstraction layers provided by cloud computer system 50 (FIG. 8) is shown. It should be understood in advance that the components, layers, and functions shown in FIG. 9 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computer system. Metering and Pricing 82 provide cost tracking as resources are utilized within the cloud computer system, and billing or invoicing for consumption of these resources. In one example, these resources may include application software licenses. Security provides identity verification for cloud consumers and tasks, as well as protection for data and other resources. User portal 83 provides access to the cloud computer system for consumers and system administrators. Service level management 84 provides cloud computing resource allocation and management such that required service levels are met. Service Level Agreement (SLA) planning and fulfillment 85 provide prearrangement for, and procurement of, cloud computing resources for which a future requirement is anticipated in accordance with an SLA.

Workloads layer 90 provides examples of functionality for which the cloud computer system may be utilized. Examples of workloads and functions which may be provided from this layer include: mapping and navigation 91; software lifecycle management 92; virtual classroom education delivery 93; data analytics processing 94; transaction processing 95; and a RDBMS 96 according to embodiments of the disclosure.

Figure 10:
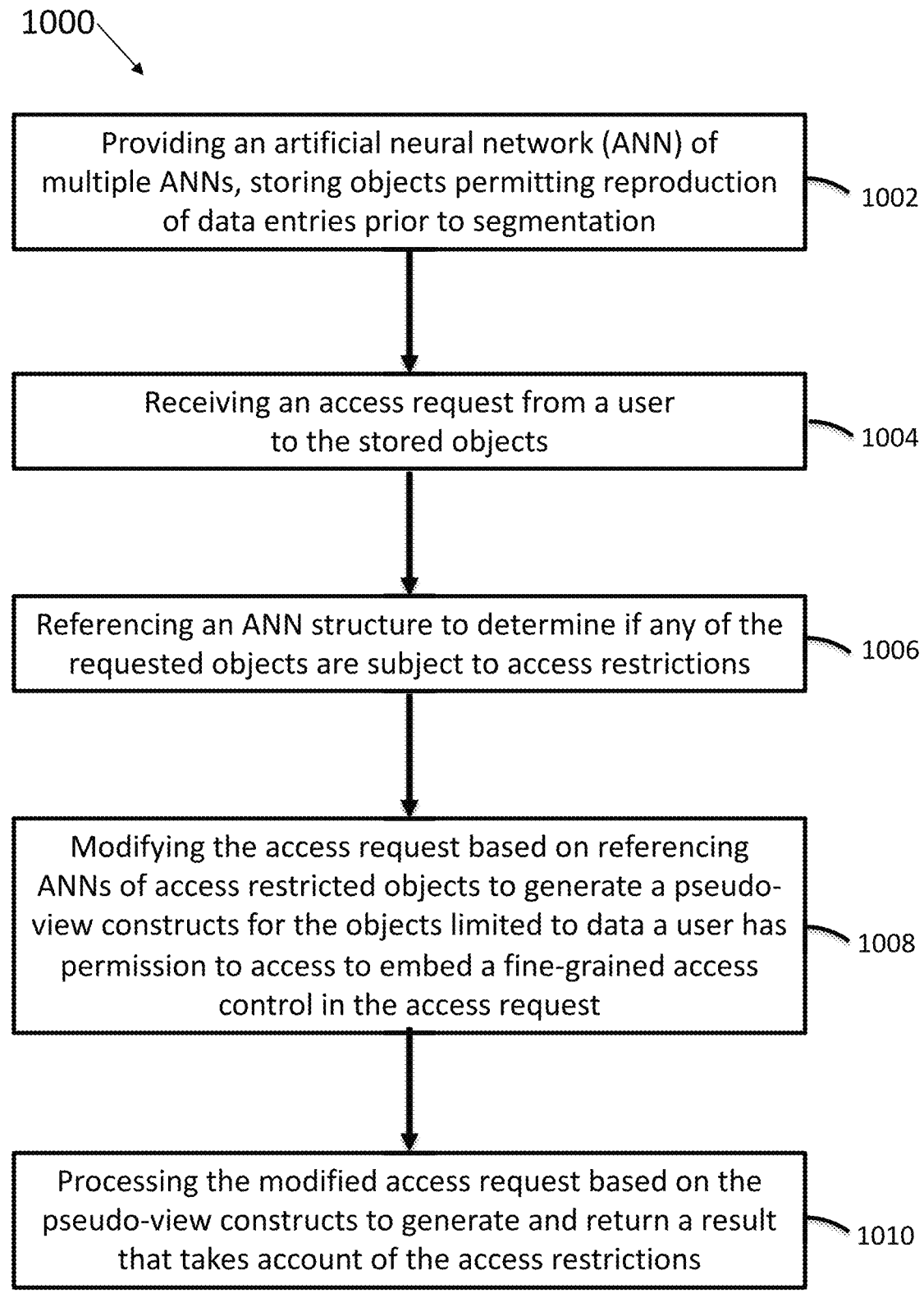
FIG. 10 depicts a flowchart of a method, according to an embodiment of the disclosure.

FIG. 10 is an exemplary flowchart of a method 1000 for accessing objects in a segmented column-major database with fine-grained access control (FGAC) taking account of user-specific access restrictions to data entries in the objects. At step 1002, an embodiment can provide an artificial neural network (ANN) structure of multiple ANNs, each storing an equally distributed segment map of segmented data entries of an object so as to permit reproduction of the row disposition of data entries in that object prior to segmentation. At step 1004, the embodiment can receive an access request from a user to access data in one or more objects stored in the segmented column-major database. At step 1006, the embodiment can reference the ANN structure to determine if any objects to be accessed by the access request are subject to access restrictions. At step 1008, the embodiment can modify the access request by referencing the ANN of each access-restricted object to generate a pseudo-view construct for that object that is limited to data entries that the user has permission to access, thereby to embed the FGAC in the access request. At step 1010, the embodiment can process the modified access request based on the pseudo-view constructs to generate and return a result that takes account of the access restrictions.

It will be clear to one skilled in the art that many improvements and modifications can be made to the foregoing exemplary embodiment without departing from the scope of the present disclosure.

It will also be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-automated method for accessing objects in a segmented column-major database with fine-grained access control (FGAC) taking account of user-specific access restrictions to data entries in the objects, the method comprising:

providing an artificial neural network (ANN) structure of multiple ANNs, each storing an equally distributed segment map of segmented data entries of an object so as to permit reproduction of a row disposition of data entries in that object prior to segmentation;

receiving an access request from a user to access data in one or more objects stored in the segmented column-major database;

referencing the ANN structure to determine if any objects to be accessed by the access request are subject to access restrictions;

modifying the access request by referencing the ANN of each access-restricted object to generate a pseudo-view construct for that object that is limited to data entries that the user has permission to access, thereby to embed the FGAC in the access request; and processing the modified access request based on the pseudo-view constructs to generate and return a result that takes account of the access restrictions to the user, wherein the processing comprises parsing the access request into a plurality of components, transforming the plurality of components into a compiler definition, and compiling the compiler definition to generate the result.

2. The computer-automated method of claim 1, wherein the objects are tables and the segment map indicates which segment belongs to which row in a table, so that the segment map when combined with a column structure of an unsegmented database that is preserved in the segmented column-major database provides FGAC.

3. The computer-automated method of claim 1, wherein the segmented data entries are tuple column group data entries.

4. The computer-automated method of claim 1, wherein the access request is a structured query language, SQL, query statement.

5. The computer-automated method of claim 1, wherein the ANN structure is stored in at least one long short-term memory (LSTM) network.

6. The computer-automated method of claim 1, wherein said processing of the modified access request proceeds without further regard to user-specific access restrictions.

7. A computer program product for accessing objects in a segmented column-major database with fine-grained access control (FGAC) taking account of user-specific access restrictions to data entries in the objects, the computer program product comprising:

one or more non-transitory computer readable storage media and program instructions stored on the one or more non-transitory computer readable storage media, the program instructions comprising:

program instructions to provide an artificial neural network (ANN) structure of multiple ANNs, each storing an equally distributed segment map of segmented data entries of an object so as to permit reproduction of a row disposition of data entries in that object prior to segmentation;

program instructions to receive an access request from a user to access data in one or more objects stored in the segmented column-major database;

program instructions to reference the ANN structure to determine if any objects to be accessed by the access request are subject to access restrictions;

program instructions to modify the access request by referencing the ANN of each access-restricted object to generate a pseudo-view construct for that object that is limited to data entries that the user has permission to access, thereby to embed the FGAC in the access request; and program instructions to process the modified access request based on the pseudo-view constructs to generate and return a result that takes account of the access restrictions to the user, wherein the processing comprises parsing the access request into a plurality of components, transforming the plurality of components into a compiler definition, and compiling the compiler definition to generate the result.

8. The computer program product of claim 7, wherein the objects are tables and the segment map indicates which segment belongs to which row in a table, so that the segment map when combined with a column structure of an unsegmented database that is preserved in the segmented column-major database provides FGAC.

9. The computer program product of claim 7, wherein the segmented data entries are tuple column group data entries.

10. The computer program product of claim 7, wherein the access request is a structured query language, SQL, query statement.

11. The computer program product of claim 7, wherein the ANN structure is stored in at least one long short-term memory (LSTM) network.

12. The computer program product of claim 7, wherein the program instructions to process the modified access request proceed without further regard to user-specific access restrictions.

13. A relational database management system (RDBMS) comprising:
   a data store configured to store a segmented column-major database;
   an artificial neural network (ANN) structure of multiple ANNs, each storing an equally distributed segment map of segmented data entries of an object so as to permit reproduction of a row disposition of data entries in that object prior to segmentation;
   at least one long short-term memory (LSTM) network configured to store the ANN structure;
   an input configured to receive user access requests to access data in one or more objects stored in the segmented column-major database;
   an access request pre-processor operable to reference the ANN structure to determine if any objects to be accessed by the access requests are subject to access restrictions and to modify the access requests by referencing the ANN of each access-restricted object to generate a pseudo-view construct for that object that is limited to data entries that the user has permission to access, thereby to embed a fine-grained access control in the access requests;
   an access request processor operable to process access requests, including the access requests that have been subject to said pre-processing, to generate a result; and
   an output for returning a result that takes account of any access restrictions to the user, wherein the processing comprises parsing the access request into a plurality of components, transforming the plurality of components into a compiler definition, and compiling the compiler definition to generate the result.

14. The RDBMS of claim 13, wherein the objects are tables and the segment map indicates which segment belongs to which row in a table, so that the segment map when combined with a column structure of an unsegmented database that is preserved in the segmented column-major database provides fine-grained access control (FGAC).

15. The RDBMS of claim 13, wherein the segmented data entries are tuple column group data entries.

16. The RDBMS of claim 13, wherein the access request is a structured query language, SQL, query statement.

17. The RDBMS of claim 13, wherein the ANN structure is stored in at least one long short-term memory, LSTM, network.

18. The RDBMS of claim 13, wherein the program instructions to process the modified access request proceed without further regard to user-specific access restrictions.

* * * * *